(12) United States Patent
Carretta et al.

(10) Patent No.: US 11,526,856 B2
(45) Date of Patent: *Dec. 13, 2022

(54) AUTOMATIC SAVINGS PROGRAM

(71) Applicant: Bank of America Corporation, Charlotte, NC (US)

(72) Inventors: Daniel A. Carretta, Clover, SC (US); Thomas M. Hancock, Charlotte, NC (US); Karen K. Lewy, Westlake Village, CA (US); Charles R. Liu, Charlotte, NC (US); Jack Meyers, Clayton, CA (US); Sheryl W. Strott, Clover, SC (US); Faith A. Tucker, Wichita, KS (US); Carrie A. Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/817,785

(22) Filed: Mar. 13, 2020

(65) Prior Publication Data
US 2020/0210975 A1 Jul. 2, 2020

Related U.S. Application Data

(63) Continuation of application No. 14/109,269, filed on Dec. 17, 2013, now Pat. No. 10,628,808, which is a
(Continued)

(51) Int. Cl.
*G06Q 20/00* (2012.01)
*G06Q 20/10* (2012.01)
(Continued)

(52) U.S. Cl.
CPC ............ *G06Q 20/10* (2013.01); *G06Q 20/40* (2013.01); *G06Q 40/02* (2013.01); *G06Q 40/025* (2013.01)

(58) Field of Classification Search
CPC ...... G06Q 20/40; G06Q 40/02; G06Q 40/025; G06Q 20/10
(Continued)

(56) References Cited

U.S. PATENT DOCUMENTS 4,750,119 A   6/1988  Cohen et al.
4,823,264 A   4/1989  Deming
(Continued)

FOREIGN PATENT DOCUMENTS

JP    200350916    2/2003
WO    9314476 A1   7/1993
(Continued)

OTHER PUBLICATIONS

Google Scholar NPL (non-patent literature) Search Results, dated Dec. 11, 2021. (Year: 2021).*
(Continued)

*Primary Examiner* — Hai Tran
(74) *Attorney, Agent, or Firm* — Banner & Witcoff, Ltd.

(57) ABSTRACT

A computer implemented method of processing a financial transaction executed by first person includes determining an automatic savings amount from the financial transaction by rounding up the amount of the financial transaction to the nearest dollar. The method further includes debiting the calculated savings amount from an account of the first person and crediting the savings amount to an account of a second person.

16 Claims, 5 Drawing Sheets

Related U.S. Application Data continuation of application No. 13/613,433, filed on Sep. 13, 2012, now Pat. No. 8,635,137, which is a continuation of application No. 12/554,395, filed on Sep. 4, 2009, now Pat. No. 8,301,530, which is a continuation of application No. 11/161,418, filed on Aug. 2, 2005, now abandoned.

(51) Int. Cl.
*G06Q 20/40* (2012.01)
*G06Q 40/02* (2012.01)

(58) Field of Classification Search
USPC ................................................. 705/35–45
See application file for complete search history.

(56) References Cited

U.S. PATENT DOCUMENTS

| | | | |
|---|---|---|---|
| 4,941,090 | A | 7/1990 | McCarthy |
| 5,056,019 | A | 10/1991 | Schultz et al. |
| 5,200,889 | A | 4/1993 | Mori |
| 5,287,268 | A | 2/1994 | McCarthy |
| 5,302,811 | A | 4/1994 | Fukatsu |
| 5,466,919 | A | 11/1995 | Hovakimian |
| 5,471,669 | A | 11/1995 | Lidman |
| 5,621,640 | A | 4/1997 | Burke |
| 5,787,404 | A | 7/1998 | Fernandez-Holmann |
| 5,970,480 | A | 10/1999 | Kalina |
| 5,987,429 | A | 11/1999 | Maritzen et al. |
| 6,036,344 | A | 3/2000 | Goldenberg |
| 6,049,778 | A | 4/2000 | Walker et al. |
| 6,088,682 | A | 7/2000 | Burke |
| 6,112,191 | A * | 8/2000 | Burke .............. G06Q 20/04 235/375 |
| 6,119,099 | A | 9/2000 | Walker et al. |
| 6,164,533 | A | 12/2000 | Barton |
| 6,267,670 | B1 | 7/2001 | Walker et al. |
| 6,298,329 | B1 | 10/2001 | Walker et al. |
| 6,381,590 | B1 | 4/2002 | Debois |
| 6,581,041 | B1 | 6/2003 | Canney |
| 6,598,024 | B1 | 7/2003 | Walker et al. |
| 6,631,358 | B1 | 10/2003 | Ogilvie |
| 6,965,868 | B1 | 11/2005 | Bednarek |
| 7,072,851 | B1 | 7/2006 | Wilcox et al. |
| 7,090,138 | B2 | 8/2006 | Rettenmyer et al. |
| 7,392,224 | B1 | 6/2008 | Bauer et al. |
| 7,398,226 | B2 | 7/2008 | Haines et al. |
| 7,597,255 | B2 | 10/2009 | Deane et al. |
| 7,753,261 | B2 | 7/2010 | Rosenblatt et al. |
| 7,797,208 | B2 | 9/2010 | Thomas |
| 8,301,530 | B2 | 10/2012 | Carretta et al. |
| 8,401,936 | B2 | 3/2013 | Penning et al. |
| 8,407,137 | B2 | 3/2013 | Thomas |
| 8,416,924 | B1 | 4/2013 | Barth et al. |
| 8,635,137 | B2 | 1/2014 | Carretta et al. |
| 8,738,429 | B2 | 5/2014 | Shepard |
| 9,495,703 | B1 | 11/2016 | Kaye, III |
| 9,734,536 | B2 | 8/2017 | Cruttenden et al. |
| 2002/0046124 | A1 | 4/2002 | Alderucci et al. |
| 2002/0120513 | A1 | 8/2002 | Webb et al. |
| 2002/0161630 | A1 | 10/2002 | Kern et al. |
| 2002/0188533 | A1 | 12/2002 | Sanchez et al. |
| 2003/0009379 | A1 | 1/2003 | Narasimhan et al. |
| 2003/0061097 | A1 | 3/2003 | Walker et al. |
| 2003/0064788 | A1 * | 4/2003 | Walker .............. G07F 17/32 463/20 |
| 2003/0101131 | A1 | 5/2003 | Warren et al. |
| 2003/0149629 | A1 | 8/2003 | Claridge et al. |
| 2003/0200163 | A1 * | 10/2003 | O'Riordan .............. G06Q 40/02 705/35 |
| 2003/0208439 | A1 * | 11/2003 | Rast .................. G06Q 20/403 705/38 |
| 2003/0233317 | A1 | 12/2003 | Judd |
| 2003/0236712 | A1 | 12/2003 | Antonucci et al. |
| 2004/0039645 | A1 | 2/2004 | Walker et al. |
| 2004/0054593 | A1 | 3/2004 | Van Luchen |
| 2004/0153400 | A1 | 8/2004 | Burke |
| 2004/0193497 | A1 | 9/2004 | Tanaka |
| 2004/0222285 | A1 | 11/2004 | Pohl |
| 2005/0004867 | A1 | 1/2005 | Spector |
| 2005/0021353 | A1 | 1/2005 | Aviles et al. |
| 2005/0021363 | A1 | 1/2005 | Stimson et al. |
| 2005/0097034 | A1 | 5/2005 | Loeger et al. |
| 2005/0133590 | A1 | 6/2005 | Rettenmyer et al. |
| 2005/0251440 | A1 | 11/2005 | Bednarek |
| 2006/0047589 | A1 | 3/2006 | Grau |
| 2007/0033134 | A1 | 2/2007 | Carretta et al. |
| 2007/0094130 | A1 | 4/2007 | Burke |
| 2007/0124203 | A1 | 5/2007 | Popescu et al. |
| 2008/0103968 | A1 | 5/2008 | Bies et al. |
| 2009/0063332 | A1 | 3/2009 | Tabaczynski et al. |
| 2009/0222358 | A1 | 9/2009 | Bednarek |
| 2010/0076776 | A1 | 3/2010 | Kopko et al. |
| 2011/0004546 | A1 | 1/2011 | Thomas |
| 2012/0072345 | A1 | 3/2012 | Solomon et al. |
| 2012/0197794 | A1 | 8/2012 | Grigg et al. |
| 2013/0030992 | A1 | 1/2013 | Carretta et al. |
| 2013/0231994 | A1 | 9/2013 | Antonucci |
| 2014/0006275 | A1 | 1/2014 | Hanson et al. |
| 2014/0012691 | A1 | 1/2014 | Hanson et al. |
| 2014/0222636 | A1 | 8/2014 | Cheng et al. |
| 2014/0337150 | A1 | 11/2014 | Anand |
| 2015/0081458 | A1 | 3/2015 | Cruttenden et al. |
| 2015/0193866 | A1 | 7/2015 | Van Heerden et al. |
| 2015/0193867 | A1 | 7/2015 | Del Vecchio et al. |
| 2015/0230045 | A1 | 8/2015 | Johnson et al. |
| 2016/0042340 | A1 | 2/2016 | Burke et al. |
| 2016/0321663 | A1 | 11/2016 | Batlle |

FOREIGN PATENT DOCUMENTS

| | | |
|---|---|---|
| WO | 03030054 A1 | 4/2003 |
| WO | 2007016697 A2 | 2/2007 |
| WO | 2008111965 A2 | 9/2008 |

OTHER PUBLICATIONS

Google Scholar Search, dated May 5, 2022. (Year: 2022).*
Google Patents Search, dated May 5, 2022. (Year: 2022).*
Aug. 2, 2005—(US)—Related U.S. Appl. No. 11/161,418.
Aug. 17, 2007 (WO) International Search Report, PCT/US 06/30362, 6 pages.
Feb. 6, 2007—(PCT)—Related Application No. PCT/US07/61694.
Feb. 8, 2008—(US)—.Related U.S. Appl. No. 61/027,397.
Jan. 2008—Option1 Credit Union, Options News About Opportunity, 5 pages.
Feb. 9, 2009—(US)—Related U.S. Appl. No. 12/368,034.
Sep. 4, 2009—(US)—Related U.S. Appl. No. 12/554,616.
Jul. 30, 2010—Supplementary European Search Report, PCT/US2006030362, 5 pages.
Mar. 24, 2010—(US)—Related U.S. Appl. No. 12/730,394.
Aug. 8, 2011 (CN) Second Office Action, Application No. 200780050996.5, 6 pages.
Dec. 13, 2011 (EP)—Office Action—Application No. Patent No. 0689359.4-221/1915731,18 pages.
Jul. 14, 2011 (EP) Communication from European Patent Office, Application No. 06 789 359.4 0 2221, 5 pages.
Jun. 14, 2011—(PCT) Response to Office Action—Application PCT/US2006/030362, 11 pages.
Nov. 24, 2011—(PCT) Response to Office Action—PCT Application PCT/US2006/030362, 4 pages.
Apr. 27, 2012—(US) File History—U.S. Appl. No. 11/161,418, filed Aug. 2, 2005.
Nov. 27, 2012—U.S. Non-Final Office Action—U.S. Appl. No. 13/613,433.
Sep. 7, 2012—(US) File History for U.S. Appl. No. 12/554,616, filed Sep. 4, 2009.
Sep. 24, 2012 U.S.—Notice of Allowance and Fee(s) Due, U.S. Appl. No. 12/554,935, 10 pages.

(56) References Cited

OTHER PUBLICATIONS

Sep. 7, 2012—(US) File History for U.S. Appl. No. 12/368,034, filed Feb. 9, 2009.
Aug. 28, 2013—U.S. Advisory Action—U.S. Appl. No. 12/730,394.
Dec. 17, 2013—(US)—Related U.S. Appl. No. 14/109,269.
Apr. 5, 2017—U.S. Office Action—U.S. Appl. No. 14/109,269.
Dec. 20, 2017—U.S. Office Action—U.S. Appl. No. 14/844,884.
Mar. 27, 2017—U.S. Office Action—U.S. Appl. No. 14/551,930.
Nov. 27, 2017—U.S. Office Action—U.S. Appl. No. 14/850,593.
Apr. 23, 2018—U.S. Office Action—U.S. Appl. No. 14/844,880.
Jan. 8, 2018—U.S. Office Action—U.S. Appl. No. 14/844,880.
Jan. 10, 2018—U.S. Office Action—U.S. Appl. No. 14/844,896.
Jan. 18, 2018—U.S. Office Action—U.S. Appl. No. 14/844,875.
Jan. 18, 2018—U.S. Office Action—U.S. Appl. No. 14/844,887.
Jul. 27, 2018—U.S. Office Action—U.S. Appl. No. 14/844,896.
May 21, 2018—U.S. Office Action—U.S. Appl. No. 14/850,593.
Banco Popular Ahorro Directo, <http://www.popular.com/ahorrodirectto/index-en.html>, downloaded Mar. 11, 2008, 3 pages.
Bank of America offers a new way to save, dated Oct. 4, 2005, www.msnbc.msn.com/id/9593071/#.UL463-SCmSo, 2 pages.
Bank of America's Twist on Debit Card Rewards, dated Oct. 6, 2005, www.depositaccounts.com/blog/2005/10/bank-of-americas-twist-on-debit-card-html, 1 page.
Bank of America's Unusual Automated Savings Plan by Jim Bruene, dated Oct. 5, 2005, © 1995-2010, Financial Insite, Inc., 2 pages.
Bank the Rest® savings program, Spend and Save. Together at last, <http://www.scotiabank.com/BankTheRest>, downloaded Jan. 25, 2012, 1 page.
Best Bets Financial Services, Premier Bank, <http://www.connectmidmissouri.com/directory/financial/premium.aspx>?id=1761644, downloaded Jan. 25, 2012, 4 pages.
Electronic Payments Primer, National Electronic Commerce Coordinating Counsel, Oct. 2002, http://www85.homepage.villanova.edu/timothy.ay/MIS3030/epayments_primer.pdf, 40 pages.
*Every Penny Counts, Inc.* v. *Bank of America Corporation and Bank of America, N.A.*, Memorandum and Order, U.S. District Court, Middle District of Florida, Fort Meyers Division, Case No. 2:07-cv-042, dated May 27, 2009, 6 pages.
*Every Penny Counts, Inc.* v. *Bank of America Corporation and Bank of America, N.A.*; Opinion and Order; U.S. District Court, Middle District of Florida, Fort Meyers Division, Case No. 2:07-cv-04-FtM-29SPC, dated Sep. 29, 2008, 16 pages.
File History for U.S. Appl. No. 12/730,394, filed Mar. 24, 2010.
Finance, <http://www.fatwallet.eom/t/52/799201/>, 11 pages, downloaded Jan. 11, 2008.
Fowler, G.A., These Apps Can Finally Get you to Save Money, <http://www.wsj.com/articles/these-apps-can-finally-get-you-to-save-money-1434477296?mod=djemptech_t>, printed Oct. 6, 2015; 5 pages.
Introducing Free Checking with Extra Savings on top, Savings just got a whole lot easier, Capital One Bank, Baton Rouge Advocate, Oct. 28, 2009, 1 page.

North Carolina Bank and Trust, Round Up to Save, https:/www.ncbtonline.com/productsandservices/personal/ <http://www.ncbtonline.com/productsandservices/personal/> rounduptosave.aspx, downloaded Jan. 25, 2012, 2 pages.
Option1 Credit Union Spare Change Debit Card Savings Program, <http://www.option1cu.org/about-bell-com/news.html>, downloaded Feb. 3, 2008, 2 pages.
Round It Up America®, Round up. Donate Change, Make a Difference, Support Round It Up America® today!, http://www.rounditupamerica.org/donate-online.php <http://www.rounditupamerica.org/donate-online.php>, downloaded Jan. 25, 2012, 2 pages.
Round It Up America®, Round up. Donate Change, Make a Difference. Recent News, <http://www/rounditupaemrica>.org, downloaded Jan. 25, 2012, 3 pages.
Round it Up America®, Round Up. Donate Change. Make a Difference, <http://www.rounditupamerica.org>, downloaded Nov. 8, 2010, 2 pages.
Text of First Office Action, PCT Application No. 20078005099965, Undated, 3 pages.
Wachovia Introduces New Product That Makes Saving Easy and Automatic for Consumers, http://www.wachovia.com/> inside/page/printer/0,,134_307% E1701.00.html, 3 pages, dated Jan. 11, 2008.
Wachovia offers customers Way2Save, <http://www.charlotte.com/businessA/-print/story/441323.html>, 1 page, downloaded Jan. 11, 2008.
Wachovia offers new savings incentive that offers deposit match, <http://www.timesanddemocrat.com/>articles/2008/01/11 /business/doc478, 2 pages, downloaded Jan. 11, 2008.
Wachovia Personal Finance FAQs, Way2Save Account, http://111.wachovia.com/personal/page/printer/0J,657_2167% 5E12663, downloaded Mar. 11, 2008, 3 pages.
Wachovia Way2Save(SM) Account Agreement, http://www.wachovia.com/rnisc/0, 1756,00.html, 2 <http://www.wachovia.com/misc/0%ef%bc%8c,1756,00.html%ef%bc%8c2>, 3 pages, downloaded Jan. 18, 2008.
Wachovia's Way2Save Savings Account, with scans, <http://bankdesign.com/boardA12618.html>, 3 pages, downloaded Jan. 11, 2008.
Wachovia, My Arch-Nemesis Bank, Offers Very Tempting 5% Plus Bonus Savings Account Deal, <http://www.punny>.org/money/wachovia-my-arch-nemesis-bank-offers-v, 7 pages, downloaded Jan. 11, 2008.
Way2save, Turn Everyday Banking Into Automatic Savings brochure, © 2008, Wachovia Corporation, 6 pages.
Who Says You Can't Afford to Save? Bank on it: Spare Change Can Add Up Fast (Third Edition), Jaffe, C.A., Mar. 5, 2000 © 2012 ProQuest LLC, 3 pages.
Wolfe, Daniel, "Wachovia Links Savings, Debit to Land Customers," American Banker, vol. 173?issue 9, Jan. 14, 2008, 3 pages.
Sep. 7, 2018—U.S. Office Action—U.S. Appl. No. 14/551,930.
May 14, 2019—U.S. Office Action—U.S. Appl. No. 14/551,930.
Dec. 2, 2019—(US) Patent Board Decision—Examiner Reversed U.S. Appl. No. 14/109,269.

\* cited by examiner

US 11,526,856 B2

AUTOMATIC SAVINGS PROGRAM

RELATED APPLICATIONS

This application is a continuation of U.S. patent application Ser. No. 14/109,269, filed Dec. 17, 2013, which is a continuation of U.S. patent application Ser. No. 13/613,433, filed Sep. 13, 2012 (now U.S. Pat. No. 8,635,137), which claims priority to U.S. patent application Ser. No. 12/554,395, filed Sep. 4, 2009 (now U.S. Pat. No. 8,301,530), which claims priority to U.S. application Ser. No. 11/161,418, filed Aug. 2, 2005, which was abandoned. All of the aforementioned are incorporated by reference in their entirety herein.

HELD OF THE INVENTION

One embodiment of the present invention is directed to the computer processing of a consumer savings program. More particularly, one embodiment of the present invention is directed to the computer processing of a consumer savings program that provides for automatic savings during any transaction.

BACKGROUND INFORMATION

Many consumers feel that saving money is difficult. Those who make less than the median income level, or are raising families, or are new immigrants, find it particularly challenging to put money away for emergencies, a child's education, or a special purchase. Even affluent consumers who do have the means to save money often feel that they could save more.

Currently, a consumer can save funds in a bank account by making deposits into the account or by transferring funds from another account. Further, they can automate the savings function by setting up recurring transfers from another account. However, the recurring transfer function is limited by the requirement to set a specific and minimum transfer amount and the need for the transfer to occur on a particular schedule. The recurring transfer function does not adequately support the flexibility of daily or small amount transfers.

In addition, grandparents or other relatives or friends sometimes desire to contribute money to somebody else's (e.g., a grandchild's) savings account. These contributors likely desire an automatic and pain free way to facilitate such a transfer of funds.

Based on the foregoing, there is a need for a system and method for automatically facilitating savings.

SUMMARY OF THE INVENTION

One embodiment of the present invention is a computer implemented method of processing a financial transaction executed by first person. The method includes determining an automatic savings amount from the financial transaction by rounding up the amount of the financial transaction to the nearest dollar. The method further includes debiting the calculated savings amount from an account of the first person and crediting the savings amount to an account of a second person.

DETAILED DESCRIPTION

One embodiment of the present invention is a computer implemented savings program in which each financial transaction by a customer of a bank or other financial institution automatically generates a savings amount which is deposited in the customer's or somebody else's savings account. Thus the customer can accumulate savings conveniently and painlessly.

Figure 1:
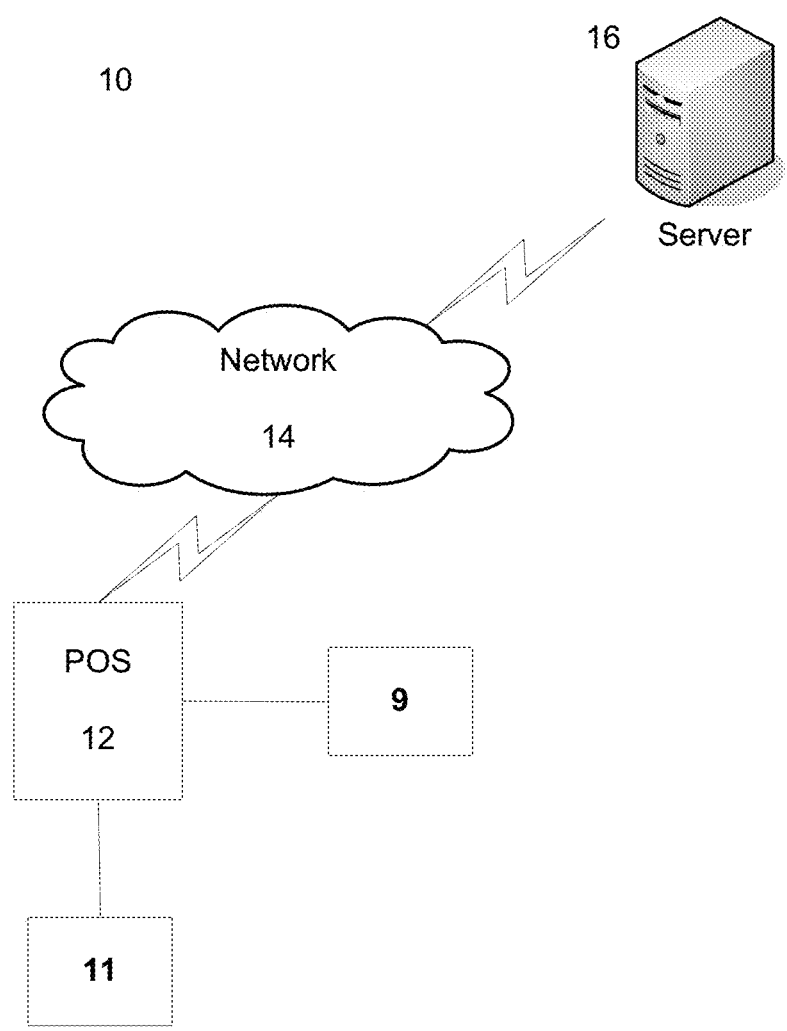
FIG. 1 is an overview diagram of a system in accordance with one embodiment of the present invention.

FIG. 1 is an overview diagram of a system 10 in accordance with one embodiment of the present invention. System 10 includes a point of sale device ("POS") 12 coupled to a computer server 16 via a network 14.

POS 12 is an electronic cash register that includes a barcode reader 9 that is used to read barcodes on products and to automatically enter the products and prices into POS 12. POS 12 further includes a card reader 11 that reads account information from a credit card, debit card, or any other type of financial device that can be used to purchase an item. POS 12 may include other devices, such as a keypad, that can also be used to read account information for facilitating a transaction. In one embodiment, POS 12 is located at a retailer.

Network 14 can be any type of network or communication device that allows POS 12 to communicate with server 16. Network 14 includes one or more routers or computer systems. In one embodiment, network 14 includes a computer system operated by the issuer of the credit card or debit card/check card used to make a purchase at POS 12 (e.g., a computer system operated by VISA).

Server 16 is a computer system operated by a bank or other financial institution that is implementing an embodiment of the present invention. Server 16 may be any type of computer or other device that is capable of communicating with network 14 and executing software steps. In one embodiment, server 16 includes a processor, memory and communication interface.

Figure 2:
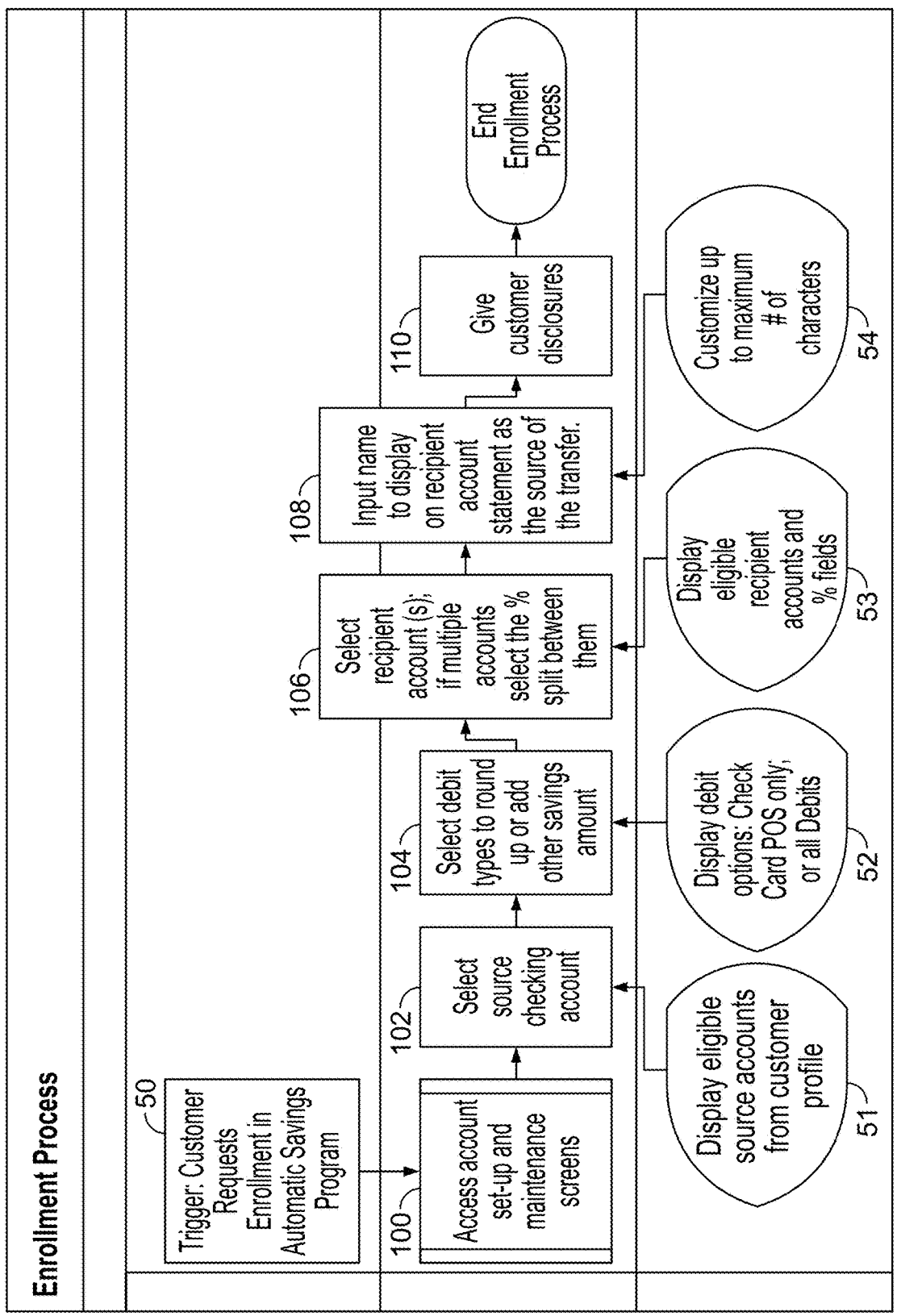
FIG. 2 is a flow diagram of the functionality performed by a server in accordance with one embodiment of the present invention in order to enroll a customer in the automatic savings program.

FIG. 2 is a flow diagram of the functionality performed by server 16 in accordance with one embodiment of the present invention in order to enroll a customer in the automatic savings program. In one embodiment, the functionality of FIG. 2, and FIG. 35 disclosed below, is implemented by software stored in memory and executed by a processor. In other embodiments, the functionality can be performed by hardware, or any combination of hardware and software.

Account set-up and maintenance screens/interfaces are accessed in response to a customer request to enroll in the automatic savings program (50). In one embodiment, the screens/interfaces are accessed by bank personnel at a terminal locally or remotely connected to server 16. In another embodiment, a user may access the screens/interfaces at a terminal remotely connected to server 16 through network 14.

The checking account that is the source of the automatic savings amount is selected. The eligible source accounts are displayed from the customer's profile. In other embodiments, another type of account instead of a checking account can be used, as long as the selected account is a source of funds.

The types of debits/transactions that are to be "round up" are selected. "Round up" refers to one method used to calculate a savings amount from a transaction. In one embodiment, the round up amount is an amount of excess funds produced by applying a rounder transaction to the amount of a transaction such as a credit/debit card charge at POS 12. If the rounder transaction rounds up to the nearest dollar, for example, a purchase made for $54.08 would generate a rounded amount of $0.92. Other embodiments of the present invention may round up to a predetermined amount besides the nearest dollar. Still further, other embodiments of the present invention may calculate the savings amount using a method other than round up. For example, a fixed percentage can be applied to each transaction to calculate a savings amount, or a fixed amount of money (e.g., $130) can be considered the savings amount. The available debits/transaction types to be round up are displayed (52) and can include only check card/debit card POS transactions, or any other types of debits. Example of other debits that can be the subject of round up or other calculation of a savings amount include paper checks, electronic bill pay, electronic checks, automatic payments and Automated Clearing House ("ACH") transfers.

106: The recipient account or accounts for the savings amount is selected based on the displayed eligible recipient accounts and % fields or the account number can be inputted. In one embodiment, possible recipient accounts include the customers own savings account, person to person transfer (e.g., a grandparent's round ups being credited to a grandchild's savings account or 529 college savings plan), charities, investment accounts, etc. In general, any account that can accept transfers can be eligible for selection. If multiple recipient accounts are selected, the customer can choose a percentage distribution for each of the accounts, or another mechanism that can be used to divide the savings amount between the multiple accounts.

108: The name to display on the recipient's account statement as the source of the transfer is input.

The name may be customized to a maximum number of characters or may default to a pre-set description. For example the account statement might state "a Transfer From Grandma".

110: The customer is given disclosures that for example, describe the customer's selections and the legal ramifications of such selections.

An embodiment of the present invention also allows the customer to modify parameters or discontinue enrollment at any time remotely using an online banking feature or other remote computing technology.

Figure 3:
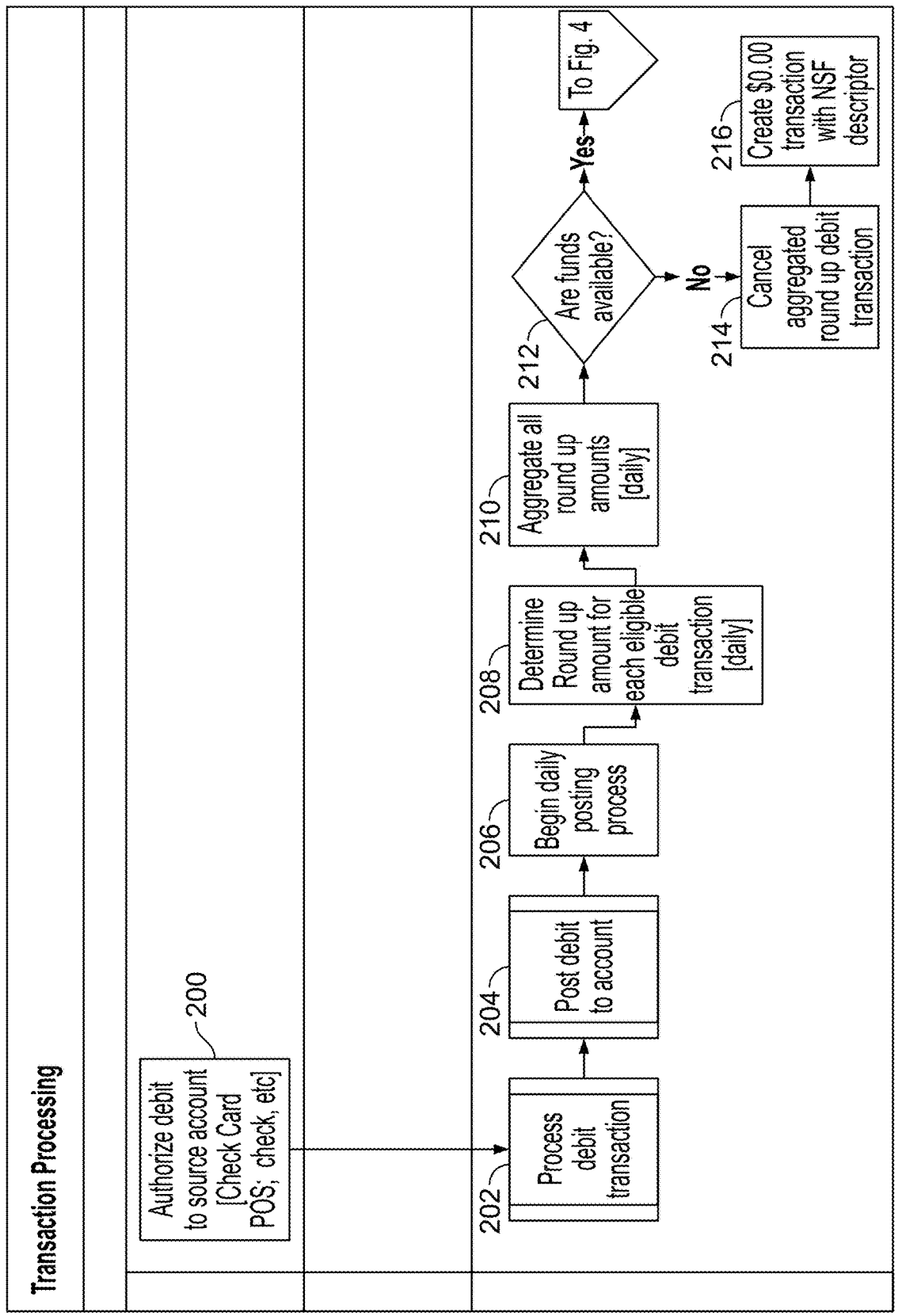
FIG. 3 is a flow diagram of the functionality performed by a server in accordance with one embodiment of the present invention to daily process the automatic savings transaction.

FIG. 3 is a flow diagram of the functionality performed by server 16 in accordance with one embodiment of the present invention to daily process the automatic savings transaction.

200: The debit to the source account (e.g., check card POS, check, etc.) selected at 102 is authorized.

202: The debit transaction, such as a purchase at POS 12 using a debit card, is processed.

204: The debit transaction is posted to the source account.

206: The daily posting transaction begins.

208: The round up amount (or other savings amount) for each eligible debit transaction is determined. This occurs on a daily basis.

210: All round up amounts are aggregated. This occurs on a daily basis. By aggregating the round ups for one daily posting, overdrafts to the source account can be avoided. In one embodiment, the daily posting occurs at the end of the day to further avoid overdrafts.

212: A determination is made if funds are available in the source account. If not, the aggregated round up debit transaction is cancelled (214) and a $0.00 transaction is created with a no funds in source account descriptor (216).

Figure 4:
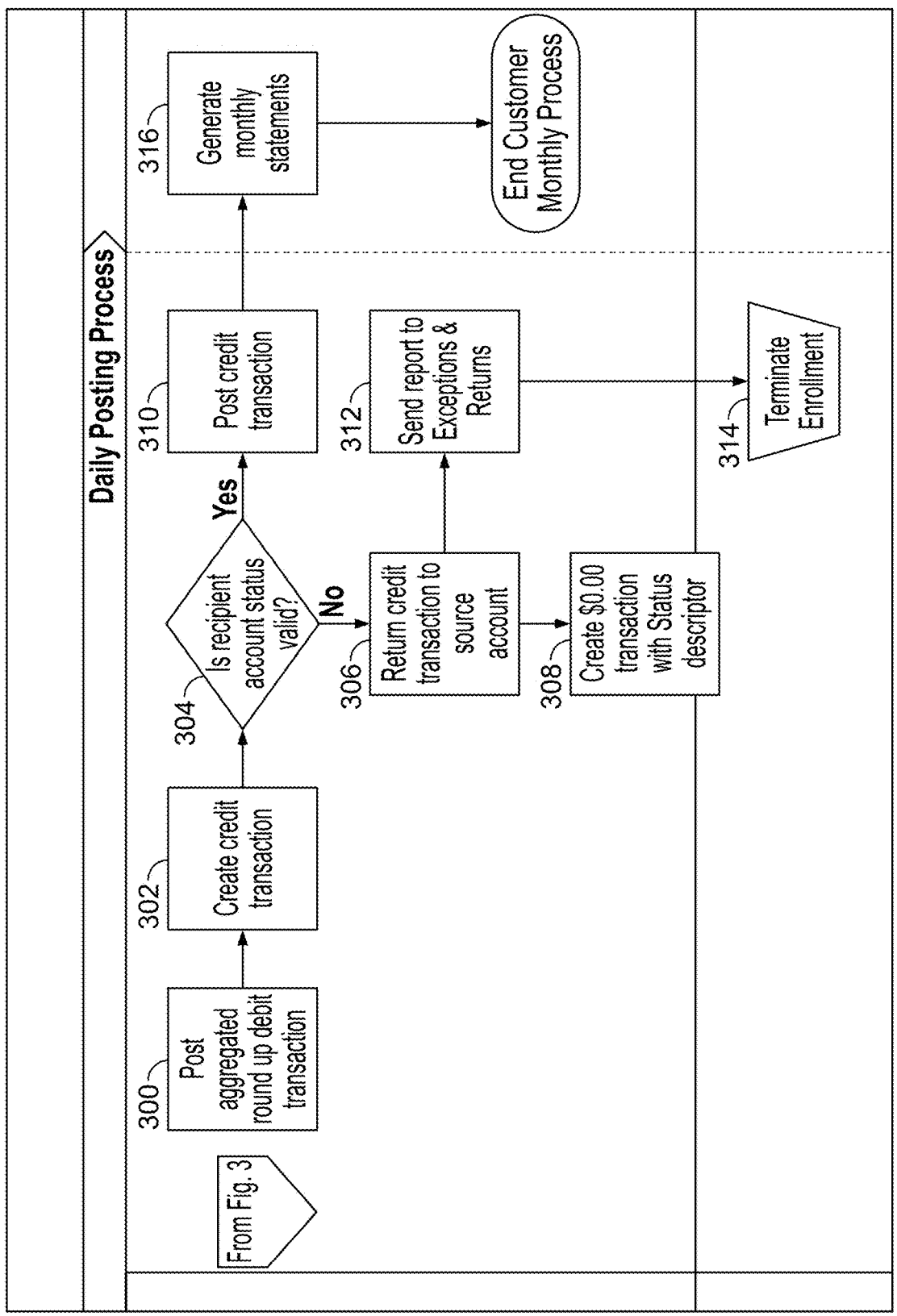
FIG. 4 is a flow diagram of the functionality performed by a server in accordance with one embodiment of the present invention to perform a daily posting of the automatic savings transaction.

FIG. 4 is a flow diagram of the functionality performed by server 16 in accordance with one embodiment of the present invention to perform a daily posting of the automatic savings transaction.

300: If funds are determined to be available at 212, the aggregated round up debit transaction is posted.

302: The credit transaction is created.

304: A determination is made if the recipient account(s) selected at 106 is valid. If it is valid, the credit transaction is posted (310).

306: If the recipient account(s) is not valid at 304, the credit transaction is returned to the source account and a $0.00 transaction is created with a status descriptor. A report of the invalid source account is sent to an "exceptions & returns" file and enrollment of the automatic savings account for that customer is terminated (312, 314).

316: Monthly statements are generated that include the automatic savings function.

Both the source and recipient accounts may display a month-to-date and year-to-date summary of round up transfers on their statements.

Figure 5:
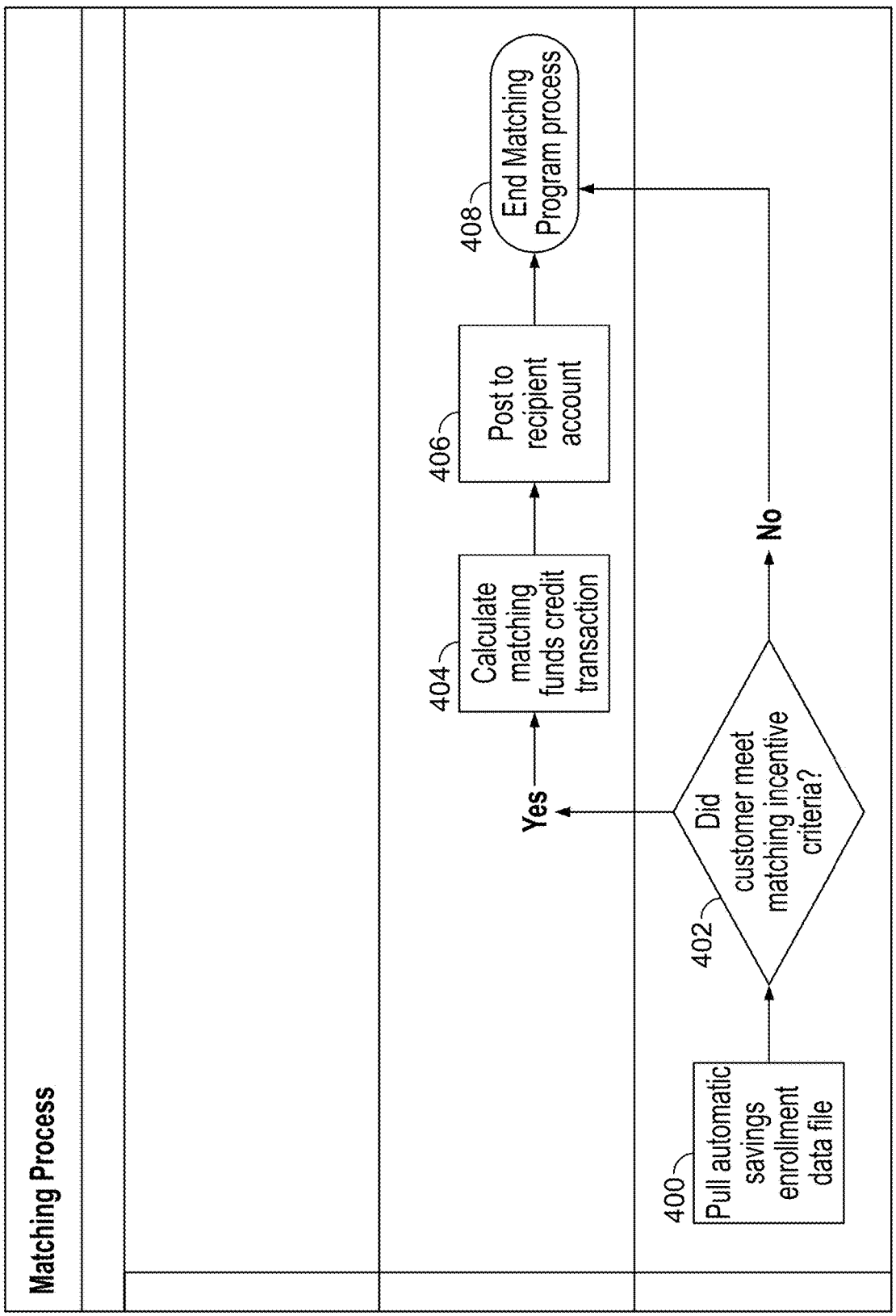
FIG. 5 is a flow diagram of the functionality performed by a server in accordance with one embodiment of the present invention to implement a matching process in conjunction with the automatic savings program.

FIG. 5 is a flow diagram of the functionality performed by server 16 in accordance with one embodiment of the present invention to implement a matching process in conjunction with the automatic savings program. A bank or other organization can implement the matching process in order to encourage more customers to enroll in the automatic savings program, or to encourage customers to modify their behavior for the benefit of the bank, such as to use their debit cards more often, use checks less, switch to electronic statements, use check safekeeping, etc. The bank can offer to match the round up or other savings amount for a fixed time period, a permanent time period, or other type of arrangement (e.g., every 10th transaction, $0.05 for every transaction, etc.).

400: During the daily posting process of FIG. 4, or at another point in the process (e.g., quarterly, annually, etc.), the customer data file for the automatic savings program is pulled. The data file stores all transactions eligible for matching and other data, such as the length of enrollment for the customer, that can be used to determine if the customer has met the matching incentive criteria.

402: It is determined if the customer met the matching incentive criteria. If not, the matching process is ended (408).

404: If the customer meets the matching incentive at 402, the matching funds credit transaction is calculated. The matching funds is then posted to the recipient account (406).

As disclosed, an automatic savings program in accordance to embodiments of the invention provides an easy and automatic method for a customer to save, and can encourage increased savings.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
 a checking account associated with a customer capable of executing debit transactions;
 a savings account associated with the customer;
 a communication interface adapted to receive financial transaction information from a point of sale device; and
 a computer server communicatively coupled over a communication network with the point of sale device, wherein the computer server comprises memory storing computer-executable instructions that, when executed by a processor of the computer server, perform steps comprising:
   (a) receiving at a financial institution, directly from the point of sale device communicating with the financial institution, information relating to a first base financial transaction associated with the checking account and relating to a transaction for at least one of goods and services between the customer and a merchant;
   (b) if the checking account has sufficient funds to cover the first base financial transaction, debiting the checking account by amount of the first base financial transaction;
   (c) receiving at the financial institution information relating to a second base financial transaction associated with the checking account;
   (d) if the checking account has sufficient funds to cover the second base financial transaction, debiting the checking account by amount of the second base financial transaction;
   (e) periodically calculating at the financial institution an aggregate savings amount based at least on the first and the second base financial transactions, wherein the periodically calculating is postponed by the computer server by a predetermined period of time;
   (f) determining if the checking account has sufficient funds to cover the aggregate savings amount;
   (g) if sufficient funds are available to cover the aggregate savings amount, debiting the aggregate savings amount from the checking account and crediting the aggregate savings amount in the savings account; and
   (h) if insufficient funds are available to cover the aggregate savings amount, bypassing the debiting of the aggregate savings amount from the checking account and the crediting of the aggregate savings amount in the savings account, while still having performed at least one of the steps (b) and (d);
 wherein computing load on the point of sale device is reduced because the calculation of the aggregate savings amount is deferred to the computer server.

2. The system of claim 1, further comprising:
 (i) periodically calculating a rewards amount; and
 (j) crediting the rewards amount in the savings account, where the rewards amount is provided by the financial institution, and where the calculating the rewards amount is for a fixed period of time,
where calculating the rewards amount is based on a predetermined percentage of the aggregate savings amount for a fixed period of time.

3. The system of claim 1, wherein calculating the aggregate savings amount is based off a fixed amount of money for each base financial transaction.

4. The system of claim 1, wherein calculating the aggregate savings amount is based off of rounding up to a next dollar amount for each base financial transaction.

5. The system of claim 1 comprising, generating a monthly statement of the first and the second base financial transactions and the aggregate savings amounts debited for a month.

6. A computer-readable medium storing computer-executable instructions for causing a processor to perform a method comprising:
   (a) posting a plurality of debit transactions from a point of sale device to a source account;
   (b) calculating, by a computer server at a financial institution, a first savings amount based on a first of the plurality of debit transactions;
   (c) calculating, by the computer server at the financial institution, a second savings amount based on a second of the plurality of debit transactions;
   (d) subsequent to step (a), calculating, by the computer server at the financial institution, an aggregate savings amount comprising the first savings amount and the second savings amount, wherein the calculating in step (d) is postponed by the computer server by a predetermined period of time;
   (e) determining whether adequate funds are available in the source account to cover the aggregate savings amount; and
   if adequate funds are available in the source account,
     i. debiting the source account by the aggregate savings amount; and
     ii. crediting a recipient account by the aggregate savings amount;
   wherein computing load on the point of sale device is reduced because the calculation of the aggregate savings amount is deferred to the computer server.

7. The computer-readable medium of claim 6, wherein the calculating the aggregate savings amount is based off one of: a fixed amount of money for each base financial transaction, and rounding up to a next dollar amount for each base financial transaction; and
 wherein the calculating an aggregate savings amount and the determining whether adequate funds are available are performed by a computer system operated by a financial institution.

8. The computer-readable medium of claim 6, wherein the aggregate savings amount is one of: equal to a predetermined monetary amount multiplied by a number of transactions of the plurality of debit transactions posted during a day; and the predetermined monetary amount applied for each transaction posted during a predetermined time period.

9. The computer-readable medium of claim 6, where recipient account is a savings account, and the source account is a checking account.

10. The computer-readable medium of claim 6, where a debit transaction of the plurality of debit transactions is associated with one of: a check card associated with the source account, and an electronic bill pay associated with the source account.

11. The computer-readable medium of claim 6, the method for saving money further comprising:
 receiving input from a holder of the source account, where the input comprises information to discontinue enrollment of the source account.

12. The computer-readable medium of claim 6, where the rewards amount credited to the recipient account is provided by a financial institution of the source account.

13. The computer-readable medium of claim 6, where a holder of the source account owns the recipient account.

14. The computer-readable medium of claim 6, where the source account is owned by a first holder and the recipient account is owned by a second holder.

15. The computer-readable medium of claim 6, the method further comprising:
   (g) generating a statement of the plurality of debit transactions and the aggregate savings amounts debited over a predetermined time period.

16. The computer-readable medium of claim 6, the method further comprising:
   (g) if adequate funds are available in the source account,
      i. calculating a rewards amount; and
      ii. crediting the recipient account by the rewards amount, where the rewards amount is provided by the financial institution and for a fixed period of time.

\* \* \* \* \*